Aug. 13, 1935. T. W. RIEKE 2,011,013
SEALING MEANS
Original Filed July 17, 1928 2 Sheets-Sheet 1
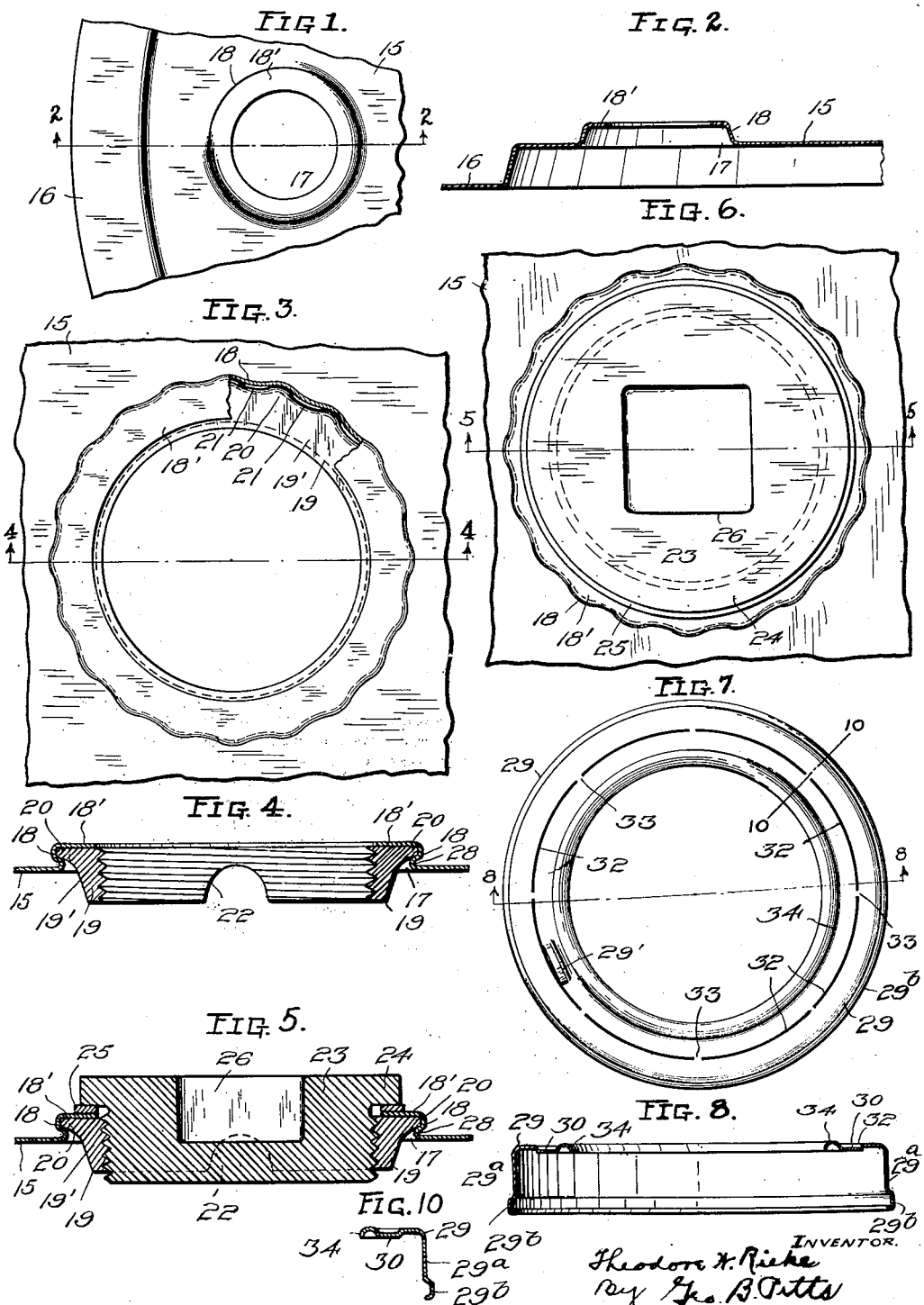

Aug. 13, 1935.  T. W. RIEKE  2,011,013
SEALING MEANS
Original Filed July 17, 1928  2 Sheets-Sheet 2
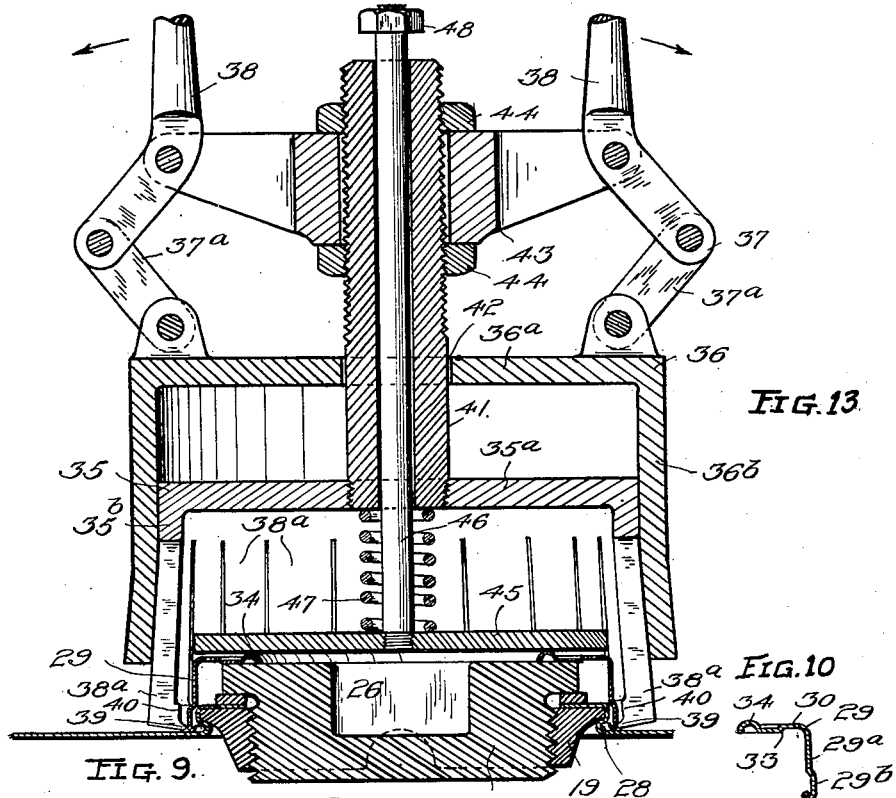
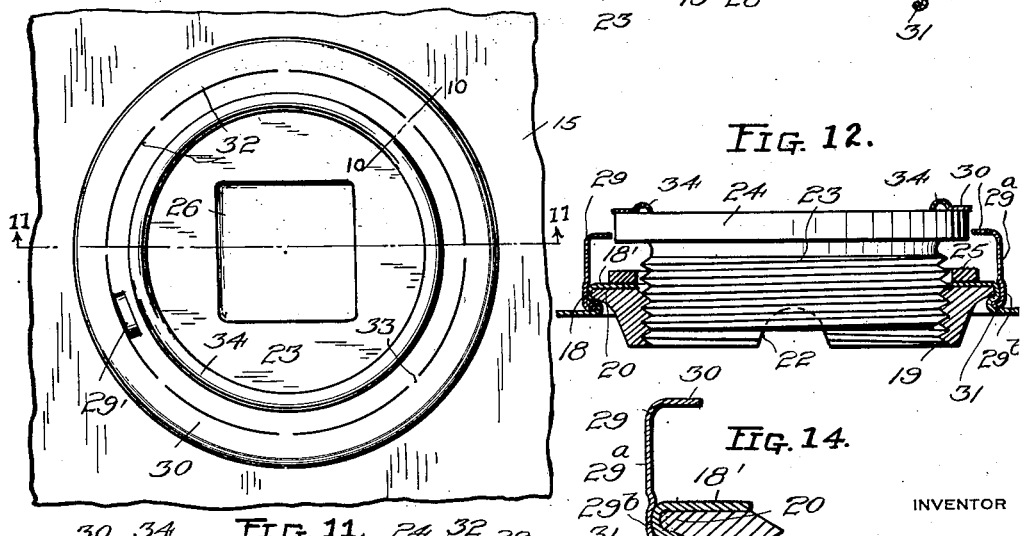
INVENTOR
Theodore W. Rieke
By
Geo. B. Pitts
ATTORNEY Patented Aug. 13, 1935

2,011,013

UNITED STATES PATENT OFFICE 2,011,013

SEALING MEANS

Theodore W. Rieke, Auburn, Ind., assignor to Rieke Metal Products Corporation, Auburn, Ind., a corporation Application July 17, 1928, Serial No. 293,346
Renewed July 9, 1934

9 Claims. (Cl. 220—39)

This invention relates to containers or barrels, more particularly to an improved sealing means for the bung thereof.

One object of the invention is to provide an improved sealing means for a plug after being positioned in its bung ring, which may be secured in fixed and sealed relation upon one wall of a barrel, whereby the plug cannot be loosened or removed without detection.

Another object of the invention is to provide an improved seal which may be so related with the plug that any unauthorized opening or tampering with the plug will be readily indicated.

Another object of the invention is to provide an improved sealing means for the plug of a bung fitting adapted to prevent unauthorized tampering or removal thereof but which permits tightening of the plug to prevent or stop leakage without affecting the seal.

Another object of the invention is to provide an improved sealing device connected to the wall of the container and so constructed that any unscrewing of the plug will be effective to break the seal, thereby rendering more easy any authorized unscrewing of the plug and making it impossible to tamper with the plug without breaking the seal, so that the latter cannot be re-shaped or re-bent to avoid detection.

A further object of the invention is to provide an improved sealing member formed of relatively thin stock but which is reinforced around one edge to insure a permanent locking with the wall of the container.

A still further object of the invention is to provide an improved sealing member connected to the wall of the container and so related to the side and exposed walls of the plug that danger of damaging the seal during handling of the container is substantially eliminated.

Other objects of the invention will be apparent to those skilled in the art to which my invention relates from the following description taken in connection with the accompanying drawings, wherein Figure 1 is a fragmentary plan view of one wall of a barrel showing the up-set wall ready to receive a bung ring.

Figure 2 is a section on the line 2—2 of Figure 1.

Figure 3 is a fragmentary plan view illustrating one form of construction for securing a bung ring to the container wall, parts being broken away.

Figs. 4 and 5 are sections on the lines 4—4 and 5—5 of Figs. 3 and 6, respectively.

Fig. 6 is a plan view of the parts shown in Fig. 3, and a plug in position.

Fig. 7 is a plan view of the sealing member embodying my invention.

Fig. 8 is a section on the line 8—8 of Fig. 7.

Fig. 9 is a fragmentary plan view showing the sealing member in sealing position to seal the plug.

Fig. 10 is a fragmentary section on the line 10—10 of Fig. 9.

Fig. 11 is a section on the line 11—11 of Fig. 9.

Fig. 12 is a view similar to Fig. 11, but showing the plug partially unscrewed and the seal broken.

Fig. 13 is a sectional view of a tool in operative relation to a sealing member showing the operation of locating upon or locking the latter to the wall of a container.

Fig. 14 is a fragmentary section, enlarged, to show the locking between the sealing member and container wall.

Referring to the drawings, 15 designates one wall of a barrel. The wall is formed from sheet metal and preferably constitutes one head of the barrel. The wall 15 is preferably provided with a flange 16, which is utilized for connecting the head to the side wall of the barrel or container. 17 indicates an opening formed in the wall 15 and about the opening is disposed an initially raised or distended portion 18, having a flange 18'. The ring 19 and fastening means therefor are of the type wherein the metal of the barrel wall folds around the flange on the ring and thus forms an annular groove or recess between the folded portions of the metal and the exposed surface of the barrel, which groove receives the free edge of a sealing device, as will later appear. In the construction of ring and fastening means therefor herein shown as one example, the ring 19 comprises an annular body part 19' having at one end a radially extending flange 20 the outer marginal edge portion of which is preferably provided with serrations 21. The inner end of the body portion 19 of the ring is provided with spaced radial notches or recesses 22 of sufficient depth to extend into the plane of the inner face of the barrel head 15, so that when the barrel is inverted, its fluid contents may freely flow through the notches 22 into the ring 19 and outwardly through the latter.

From Figure 4 it will be noted that the flange 20 of the bung ring is sealed and mounted in fixed relation to the opening 17 by folding over or inturning the portion 18 about the flange 20 and by crimping the metal of the portion 18 into the serrations 21 of the flange 20. Thus a relative tight joint and seal are provided between the wall 15, and the ring 19. The interior of the ring 19 is threaded from end to end to detachably receive therein a threaded plug 23 adapted to be screwed into the ring. The construction of the ring flange and method of fastening the ring in position is disclosed in my copending application Ser. No. 86,255, filed February 5, 1926. The plug 23 has an outstanding annular shoulder or flange 24 which engages the flange 18' when the plug 23 is turned or screwed into the ring 19. A gasket or packing ring 25 may be interposed between the flange 18' and the shoulder 24. The plug 23 may be provided with an outer angularly faced portion providing a nut by means of which the plug may be readily turned, but preferably it is formed with a non-circular recess 26 in its outer end or face for the reception of a suitable tool to effect an interlocking engagement with the plug to turn the same. In this form of construction the outer end of the plug is flat or plane.

From Figures 4 and 5 it will be apparent that the portion 18 when folded about the flange 20 provides the annular groove 28 extending entirely around the bung and beneath the serrated flange 20. This groove 28 is utilized for interlocking or connecting a sealing member 29 to the wall 15 and in operative relation to the plug 23 when the latter is in place. This sealing member preferably comprises an annular body preferably formed of relatively thin, flexible metal and having a side wall 29a surrounding the flange 24 of the plug, a locking portion 29b around the inner edge of the side wall adapted to be turned inwardly circumferentially into the groove or recess 28 (see Figs. 11, 13 and 14) and an inturned flange 30 around its outer edge adapted to lie over the annular marginal portion of the flange or shoulder more or less as desired. The locking portion is preferably shaped to snugly fit over the metal wall 18 folded around the ring flange 20 and its lower free edge is beaded, as shown at 31, to reinforce such edge so that when it is bent or crimped inwardly into the groove 28 by any suitable means, it will be more securely connected to the wall 15, the reinforcement rendering it difficult to distort the locking portion 29b sufficiently to permit it to ride over the shoulder formed by the metal portion 18 that is folded around the flange 20, and hence readily indicating in an effective manner any tampering with the sealing member by an attempt to disengage it from or relative to the wall 15. The flange 30 is weakened to reduce its area in a circumferential direction, so that indication of any tampering or unscrewing of the plug 23 will readily result and to reduce and substantially eliminate any tendency of the plug when unscrewed to disconnect the locking portion from the container wall 15, which, if effected, would remove evidence that the sealing member had been originally applied to the container. To effect weakening of the flange 30, I slit it throughout one or more portions of its circumference. In the preferred form of construction I slit the flange on a circle concentric to the axis of the sealing member, which is also substantially the axis of the plug 23, there being a plurality of slits throughout the circumference of the circle, as shown at 32, whereby there are provided radially extending devices 33 between the outer and inner portions of the flange 30, connecting these portions together. Each slit 32 preferably terminates relatively close to ends of the adjoining slit ends so as to leave relative narrow connecting devices which may be readily broken or distorted upon the unscrewing of the plug 23. The slits 32 preferably coincide with the side wall of the shoulder 24 of the plug 23, so that when the latter is unscrewed, the upper circumferential edge of the shoulder will engage the connecting devices 33 and have a shearing effect on them to distort them, or if the plug is unscrewed far enough to shear one or more of them off as shown in Fig. 12. If unscrewed far enough all of the devices 33 will be sheared and disconnect the inner flange portion from the outer flange portion, whereby the plug 23 may be readily replaced and removed. Due to the fact that the devices 33 are relatively narrow, very little backing up of the plug is necessary to distort them and thus indicate tampering.

It will be noted that in my construction the inner marginal edge of the flange 30 has an upstanding rib 34 to strengthen and reinforce such edge and also to form a rounded surface with its inner circumferential edge turned downwardly, the rounded portion serving as a suitable reinforced surface to engage and ride on surfaces, walls or objects incident to handling and the edge being inturned so that it cannot engage projections in such surfaces, walls or objects and become distorted thereby. It will also be noted that that portion of the flange 30 outwardly of the rib 34 and terminating at or along the edges of the slits 32 is disposed in a plane below the upper surface of the outer portion of the flange; that is to say, this portion of the flange is so arranged that the upper free edges of the slits on the inner flange portion are below the upper free edges of the slits on the outer flange portion. In this arrangement the free end edges of the slits on the outer flange portion have the appearance of side walls of the depressed portion and results in giving the flange a corrugated appearance, so that an unauthorized person might unscrew the plug a slight distance and effect distortion of the flange or devices 33 before discovering the slits.

For the purpose of tying or wiring a tag on the sealing member, its wall (preferably the flange) is slitted on parallel lines or on a line parallel to one of the slits 32 and the intermediate portion of the flange wall is up-set to form a loop, as shown at 29'.

I have shown in Fig. 13 a suitable device or tool for locking or connecting a sealing member to the wall of a container by inturning or crimping its reinforced edge 31 into the groove 28. This device comprises a pair of relatively movable members 35, 36, one arranged within the other, and means, such as suitable toggles 37 for operating them, one link of each toggle being extended to form an operating handle 38. The member 35 consists of a head 35a having an annular skirt 35b the outer portion of which flares outwardly slightly, which portion is slitted from its free circumferential edge inwardly to form a plurality of fingers 38a. The fingers 38a are slightly bent outwardly so that they clear the sides of the sealing member when positioned as shown in Fig. 13. The free ends of the fingers 38a are provided with inwardly extending toes 39 and compression walls 40, so that when the fingers are moved inwardly, as will later appear, the compression walls 40 will compress the locking portion 29b against the metal portion 18 and the toes will bend the beaded edge 31 into the groove 28. The fingers 38a and skirt portion 35b to which they are connected are formed of spring metal so that the fingers normally tend to move outwardly to the position shown in Fig. 13. The member 36 consists of a head 36a having an annular skirt 36b the outer portion of which serves to engage the fingers 38a as the members 35, 36, move relative to each other in one direction, that is, the outer member moves toward the free ends of the fingers, to simultaneously move the fingers inwardly as already set forth. The head of the inner member is provided with a shank 41, which is hollow for a purpose later to be set forth. The shank 41 extends through an opening 42 formed in the head 36a and carries a cross head 43 on which the levers 38 are mounted. As shown one link of each toggle 37 forms an extension of the lever 38 and the other link 37a of the toggle is pivoted to the head 36a. Due to the pivoting of these links 37a on the head 36a and mounting of the levers 38 on the shank which is connected to the head 35a, movement of the levers 38 outwardly (see arrows in Fig. 13) will slide the member 36 on the member 35 toward the free end of its skirt. By preference, the shank 41 is threaded for a considerable portion of its length beyond the head 36a to take two nuts 44 between which the cross head 43 is mounted, the nuts permitting the cross head to be adjusted along the shank 41 to increase or diminish the length of movement of the member 36 relative to the member 35. 45 indicates a plate movably mounted within the member 35, being provided with a shank 46 which extends through and has sliding support in the opening in the shank 41. Surrounding the shank 46 and between the plate 45 and head 35a (or inner end of the shank 41) is a coiled spring 47 normally tending to push or urge the plate 45 outwardly, this movement being limited by a collar, such as a nut 48 on the opposite or free end of the shank 46 adapted to engage the outer end of the shank 41. The purpose of the plate 45 is to yieldingly engage the sealing member 29, as shown in Fig. 13, when the tool is positioned in operative relation thereto and to hold it in position while the tool is being operated.

To those skilled in the art to which my invention relates, many changes in construction and widely differing embodiments and applications of the invention will suggest themselves without departing from the spirit and scope thereof. My disclosures and the description herein are purely illustrative and are not intended to be in any sense limiting.

What I claim is:

1. A device for sealing a removable member upon its support comprising a side wall one circumferential edge of which is adapted to be secured to the wall of a support and an annular flange extending from the opposite circumferential edge of said side wall and adapted to overlie the marginal edge of a removable member when associated with the support, said flange having a slit or opening disposed substantially in alignment with the periphery of the removable member to weaken a portion of the flange, the marginal portion of said flange being shaped in cross section to form a rib having a rounded outer surface, and the free edge of said rib being turned inwardly toward the first mentioned circumferential edge of said side wall.

2. In a barrel having a pressed-in bung ring, a sheet metal wall formed with an opening defined by a tubular projection from one side of the wall terminating in an inwardly directed flange, a bung ring having a threaded interior and a laterally projecting flange and arranged to be positioned from the opposite side of said wall in the tubular portion, said ring comprising a body portion and said flange, the latter having a non-circular periphery, one face of the flange operatively bearing against the inside face of the preformed flange, the tubular portion adjacent the body surrounding the body flange and being folded around the side edges of said ring flange and inwardly below the same into concentric relation to the body portion of the ring and above the plane of the sheet metal wall and forming an externally directed groove below the internally directed groove receiving the ring flange and formed by the flange enveloping portion, the first mentioned flange and the folded portion, a plug closure having threaded connection with the ring threading, and a peripheral retainer for said plug including a body portion adapted to overlie said plug and a peripheral portion peripherally enclosing the plug and the preformed flange and terminating in a free edge adapted to be inturned below the union of the preformed flange and the ring and seatable in the external groove between the said preformed flange and the sheet metal wall immediately adjacent thereto.

3. In a barrel having a pressed-in bung ring, a sheet metal wall formed with an opening defined by a tubular projection from one side of the wall terminating in an inwardly directed flange, a bung ring having a threaded interior and a laterally projecting flange and arranged to be positioned from the opposite side of said wall in the tubular portion, said ring comprising a body portion and said flange, the latter having a non-circular periphery, one face of the flange operatively bearing against the inside face of the preformed flange, the tubular portion adjacent the body surrounding the body flange and being folded around the side edges of said ring flange and inwardly below the same into concentric relation to the body portion of the ring and above the plane of the sheet metal wall and forming an externally directed groove below the internally directed groove receiving the ring flange and formed by the flange enveloping portion, the first mentioned flange and the folded portion, a plug closure having threaded connection with the ring threading, and a peripheral retainer for said plug including a body portion adapted to overlie said plug and a peripheral portion peripherally enclosing the plug and the preformed flange and terminating in a free edge adapted to be inturned below the union of the preformed flange and the ring and seatable in the external groove between the said preformed flange and the sheet metal wall immediately adjacent thereto, said peripheral retainer having a centrally apertured portion exposing the external central portion of the plug closure, said central external portion of the plug closure being fashioned for tool engagement, the central aperture of the peripheral retainer permitting tool engagement thereof after the retainer is permanently mounted in the external groove.

4. In a barrel having a pressed-in bung ring, a sheet metal wall formed with an opening defined by a tubular projection from one side of the wall terminating in an inwardly directed flange, a bung ring having a threaded interior and a laterally projecting flange and arranged to be positioned from the opposite side of said wall in the tubular portion, said ring comprising a body portion and said flange, the latter having a non-circular periphery, one face of the flange operatively bearing against the inside face of the preformed flange, the tubular portion adjacent the body surrounding the body flange and being folded around the side edges of said ring flange and inwardly below the same into concentric relation to the body portion of the ring and above the plane of the sheet metal wall and forming an externally directed groove below the internally directed groove receiving the ring flange and formed by the flange enveloping portion, the first mentioned flange and the folded portion, a plug closure having threaded connection with the ring threading, a peripheral retainer for said plug including a body portion adapted to overlie said plug and a peripheral portion peripherally enclosing the plug and the preformed flange and terminating in a free edge adapted to be inturned below the union of the preformed flange and the ring and seatable in the external groove between the said preformed flange and the sheet metal wall immediately adjacent thereto, and a gasket bearing on the external side of the preformed flange and engageable by the plug, said plug having a laterally projecting flange for such engagement.

5. In a barrel having a pressed-in bung ring, a sheet metal wall formed with an opening defined by a tubular projection from one side of the wall terminating in an inwardly directed flange, a bung ring having a threaded interior and a laterally projecting flange and arranged to be positioned from the opposite side of said wall in the tubular portion, said ring comprising a body portion and said flange, the latter having a non-circular periphery, one face of the flange operatively bearing against the inside face of the preformed flange, the tubular portion adjacent the body surrounding the body flange and being folded around the side edges of said ring flange and inwardly below the same into concentric relation to the body portion of the ring and above the plane of the sheet metal wall and forming an externally directed groove below the internally directed groove receiving the ring flange and formed by the flange enveloping portion, the first mentioned flange and the folded portion, a plug closure having threaded connection with the ring threading, a peripheral retainer for said plug including a body portion adapted to overlie said plug and a peripheral portion peripherally enclosing the plug and the preformed flange and terminating in a free edge adapted to be inturned below the union of the preformed flange and the ring and seatable in the external groove between the said preformed flange and the sheet metal wall immediately adjacent thereto, said peripheral retainer having a centrally apertured portion exposing the external central portion of the plug closure, said central external portion of the plug closure being fashioned for tool engagement, the central aperture of the peripheral retainer permitting tool engagement thereof after the retainer is permanently mounted in the external groove, and a gasket bearing on the external side of the preformed flange and engageable by the plug, said plug having a laterally projecting flange for such engagement.

6. In combination, a sheet metal wall having an opening adapted to be closed by a plug, a tubular portion projecting from one face of the wall and defining said opening and terminating in an inwardly directed flange, the tubular wall between the plate and the flange having a reverse curvature in cross section forming an internally inwardly directed groove immediately adjacent the flange and an outwardly directed external groove between said inwardly directed groove and the wall, a bung ring having an outwardly directed flange and an internally threaded opening extended therethrough, the flange of said ring being seatable in said internal groove and clampingly retained thereby, said internal groove and flange having a cooperative engagement preventing rotation of the ring in the groove, a plug having threaded connection with the threaded opening of the ring and having its outer end projecting above the plane of the flange, and a plug retainer having a portion operatively engaging an outer surface of the plug and a tubular body portion peripherally enveloping the same and the tubular portion and terminating adjacent the external groove, the terminating end of said retainer being inwardly directed and nested in said external groove for preventing removal of the plug without destruction of the retainer.

7. In combination, a sheet metal wall having an opening adapted to be closed by a plug, a tubular portion projecting from one face of the wall and defining said opening and terminating in an inwardly directed flange, the tubular wall between the plate and the flange having a reverse curvature in longitudinal cross section forming an internally inwardly directed groove immediately adjacent the flange and an outwardly directed external groove between said inwardly directed groove and the wall, a bung ring having an outwardly directed flange and an internally threaded opening extended therethrough, the flange of said ring being seatable in said internal groove and clampingly retained thereby, said internal groove and flange having a cooperative engagement preventing rotation of the ring in the groove, a plug having threaded connection with the threaded opening of the ring and having its outer end projecting above the plane of the flange, and a plug retainer having a portion operatively engaging an outer surface of the plug and a tubular body portion peripherally enveloping the same and the tubular portion and terminating adjacent the external groove, the terminating end of said retainer being inwardly directed and nested in said external groove for preventing removal of the plug without destruction of the retainer, said retainer having a centrally apertured portion to expose an outer surface of the plug, said exposed outer surface of the plug being arranged for tool engagement and said aperture in the retainer permitting tool access to the tool engageable portion of the plug for plug tightening without destruction of the retainer.

8. In combination, a sheet metal wall having an opening adapted to be closed by a plug, a tubular portion projecting from one face of the wall and defining said opening and terminating in an inwardly directed flange, the tubular wall between the plate and the flange having a reverse curvature in longitudinal cross section forming an internally inwardly directed groove immediately adjacent the flange and an outwardly directed external groove between said inwardly directed groove and the wall, a bung ring having an outwardly directed flange and an internally threaded opening extended therethrough, the flange of said ring being seatable in said internal groove and clampingly retained thereby, said internal groove and flange having a cooperative engagement preventing rotation of the ring in the groove, a plug having threaded connection with the threaded opening of the ring and having its outer end projecting above the plane of the flange, a plug retainer having a portion operatively engaging an outer surface of the plug and a tubular body portion peripherally enveloping the same and the tubular portion and terminating adjacent the external groove, the terminating end of said retainer being inwardly directed and nested in said external groove for preventing removal of the plug without destruction of the retainer, and a gasket operatively interposed between the flange on said tubular portion and the plug for sealing the plug and ring connection.

9. In combination, a sheet metal wall having an opening adapted to be closed by a plug, a tubular portion projecting from one face of the wall and defining said opening and terminating in an inwardly directed flange, the tubular wall between the plate and the flange having a reverse curvature in longitudinal cross section forming an internally inwardly directed groove immediately adjacent the flange and an outwardly directed external groove between said inwardly directed groove and the wall, a bung ring having an outwardly directed flange and an internally threaded opening extended therethrough, the flange of said ring being seatable in said internal groove and clampingly retained thereby, said internal groove and flange having a co-operative engagement preventing rotation of the ring in the groove, a plug having threaded connection with the threaded opening of the ring and having its outer end projecting above the plane of the flange, a plug retainer having a portion operatively engaging an outer surface of the plug and a tubular body portion peripherally enveloping the same and the tubular portion and terminating adjacent the external groove, the terminating end of said retainer being inwardly directed and nested in said external groove for preventing removal of the plug without destruction of the retainer, said retainer having a centrally apertured portion to expose an outer surface of the plug, said exposed outer surface of the plug being arranged for tool engagement and said aperture in the retainer permitting tool access to the tool engageable portion of the plug for plug tightening without destruction of the retainer, and a gasket operatively interposed between the flange on said tubular portion and the plug for sealing the plug and ring connection.

THEODORE W. RIEKE.

DISCLAIMER 2,011,013.—*Theodore W. Rieke*, Auburn, Ind. SEALING MEANS. Patent dated August 13, 1935. Disclaimer filed January 14, 1939, by the assignee, *Rieke Metal Products Corporation*.

Hereby enters this disclaimer to claims 2, 4, 6, and 8 of the specification.

[*Official Gazette February 7, 1939.*]